United States Patent [19]

Fujikawa et al.

[11] 4,114,586

[45] Sep. 19, 1978

[54] ACCESSORY MOUNTING MEANS FOR INTERNAL COMBUSTION ENGINES

[75] Inventors: Tetsuzo Fujikawa, Kobe; Kichiji Misawa, Akashi, both of Japan

[73] Assignee: Kawasaki Jukogyo Kabushiki Kaisha, Japan

[21] Appl. No.: 798,126

[22] Filed: May 18, 1977

Related U.S. Application Data

[63] Continuation of Ser. No. 623,119, Oct. 16, 1976, abandoned.

[30] Foreign Application Priority Data

Oct. 17, 1974 [JP] Japan ............................ 49-125943

[51] Int. Cl.[2] ........................ F02F 7/00; F16H 1/20

[52] U.S. Cl. ............................ 123/195 A; 74/15.63; 123/198 C

[58] Field of Search ............ 123/195 A, 198 C, 41.47; 74/15.63

[56] References Cited

U.S. PATENT DOCUMENTS

| | | | |
|---|---|---|---|
| 1,308,807 | 7/1919 | Postel-Vinay | 123/195 A |
| 2,568,473 | 9/1951 | Tucker | 123/195 A |
| 2,720,198 | 10/1955 | Scheiterlein | 123/195 A |
| 2,862,484 | 12/1958 | Haas et al. | 123/195 A |
| 3,447,393 | 6/1969 | Wiseman et al. | 123/195 A |
| 3,447,515 | 6/1969 | Wiseman et al. | 123/195 A |
| 3,728,995 | 4/1973 | Schramm | 123/195 A |
| 3,926,157 | 12/1975 | Lippitsch | 123/198 C |

*Primary Examiner*—Charles J. Myhre
*Assistant Examiner*—Craig R. Feinberg
*Attorney, Agent, or Firm*—Flehr, Hohbach, Test, Albritton & Herbert

[57] ABSTRACT

An internal combustion engine comprising a crankshaft mounted in a crankcase and connected with a piston through a connecting rod, an accessory drive shaft connected at one end with the crankshaft and support at the same end by the crankcase, a water pump including a rotatable element connected with the other end of the accessory drive shaft and a casing having an outlet port connected with a co-operating passage in the crankcase, said casing being secured to the crankcase at the outlet port portion so as to provide a rigid support for the drive shaft.

1 Claim, 2 Drawing Figures

ACCESSORY MOUNTING MEANS FOR INTERNAL COMBUSTION ENGINES

This is a continuation, of application Ser. No. 623,119 now abandoned, filed Oct. 16, 1975.

The present invention relates to accessory mounting means for engines and more particularly to means for mounting engine driven accessories.

In internal combustion engines, it has been found as advantageous to provide accessory drive shaft in parallel with engine crankshaft whereby one or more of engine accessories such as a water pump, a lubrication oil pump, a tachometer pick-off, a breaker means in a magnets device and an oil circulation pump for a fluidic torque converter may be arranged in axially aligned relationship. The arrangement provides advantages in that spaces beneath carburation means or beneath exhaust system can effectively be utilized, however, since the accessory driving shaft is supported in a canti-lever fashion, it cannot provide a rigid support for accessories when an increased number of accessories are to be mounted.

Therefore, it is an object of the present invention to provide means for rigidly supporting accessories on internal combustion engines.

Another object of the present invention is to provide rigid and compact means for mounting accessories on internal combustion engines.

According to the present invention, the above and other objects can be accomplished by an internal combustion engine comprising a crankshaft disposed in a crankcase, an accessory drive shaft arranged in in parallel with the crankshaft and interconnected therewith at one end to be driven thereby, a water pump including a rotatable element connected with the other end of the accessory drive shaft, said water pump further including a casing mounted on said crankcase and supporting adjacent end portion of the accessory drive shaft, said casing having water port means connected with cooperating passage means provided in the crankcase. Further accessories may be mounted on the accessory drive shaft between the opposite ends thereof. The present invention is particularly suitable for application to two cycle engines but is not limited to such applications.

Figure 1:
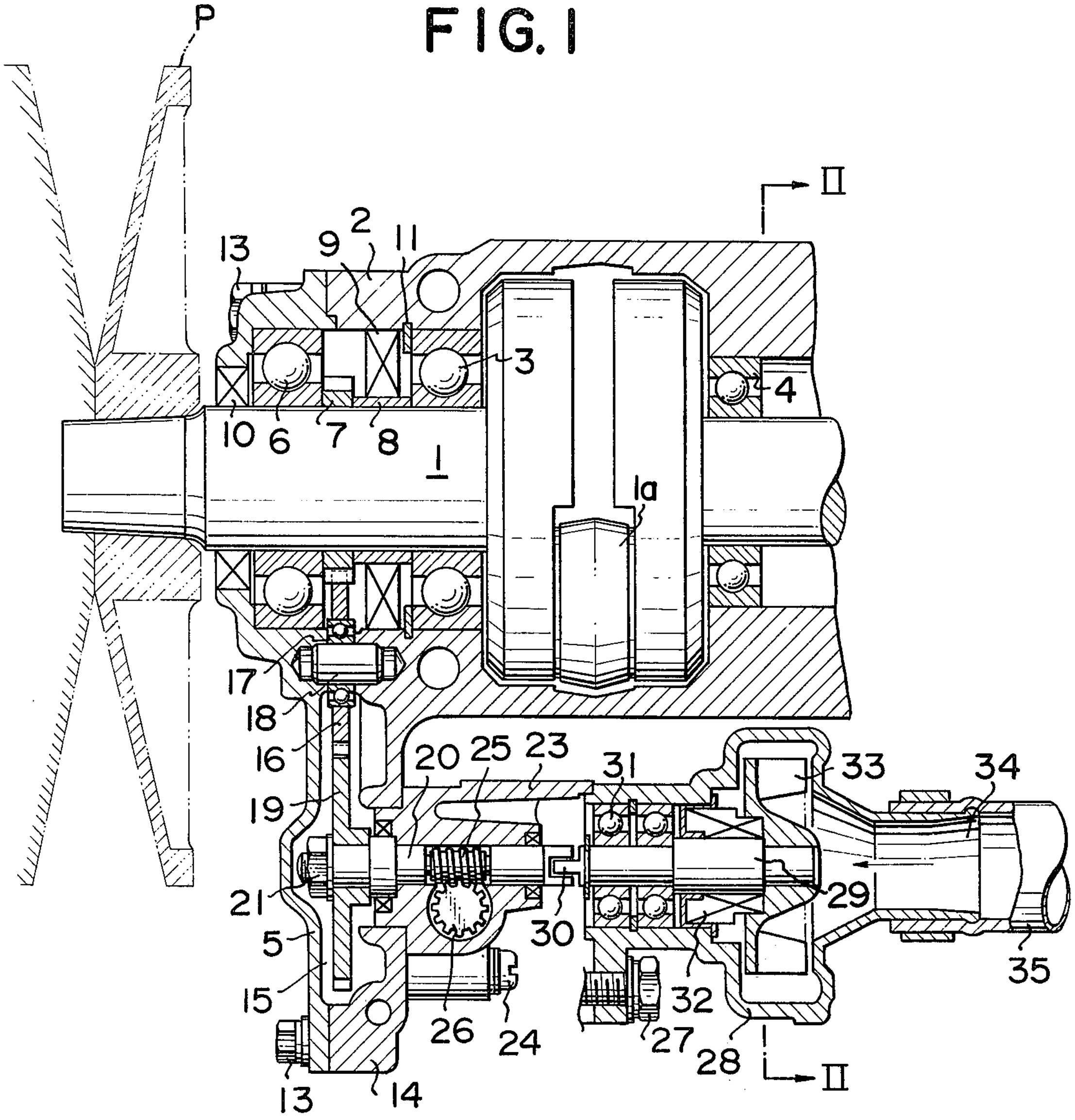
Figure 2:
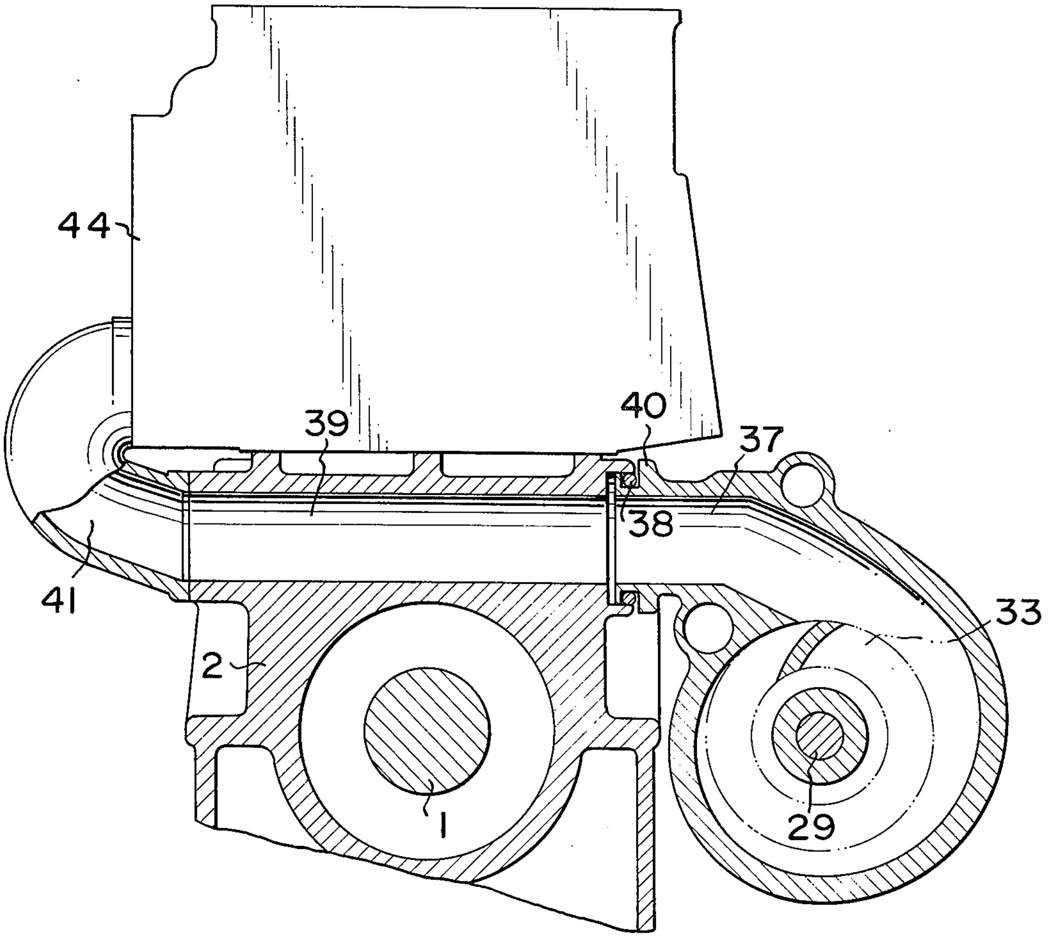

The above and other objects and features of the present invention will become apparent from the following description of a preferred embodiment taking reference to the accompanying drawings, in which:

FIG. 1 is a fragmentary sectional view of an accessory drive mechanism in a two cycle engine embodying the feature of the present invention; and FIG. 2 is a sectional view taken substantially along the line II—II in FIG. 1.

Referring to the drawings, the engine shown therein includes a crankshaft 1 disposed in a crankcase 2 and mounted thereon for rotation by bearings 3. As well known in the art, the crankshaft 1 is connected through a connecting rod 1*a* with a piston (not shown) which is slidably received in a cylinder generally shown by the reference numeral 44 in FIG. 2. An end cover 5 is secured to the crankcase 2 by means of bolts 13 and a bearing 6 is disposed to support the crankshaft 1 on the end cover 5. An output pulley P is secured to one end of the crankshaft 1 as well known in the art.

The crankshaft 1 also has an accessory drive gear 7 secured thereto between the bearings 3 and 6. A collar 8 is disposed between the gear 7 and the bearing 3 for axially retaining the gear 7. As in conventional arrangements, mechanical seals 8 and 9 and a side thrust ring 11 are provided.

The accessory drive gear 7 meshes an idler gear 16 which is mounted through a bearing 17 on a counter shaft 18. The idler gear 16 is in turn meshed with a gear 19 which is housed in a gear case portion 14 formed integrally with the crankcase 2. The gear 19 is secured by means of a nut 21 to one end of an oil pump driving shaft 20 which is arranged in parallel with the crankcase 1. The oil pump driving shaft 20 is housed in an oil pump housing 23 which is mounted on the crankcase 2 by means of screws 24. The shaft 20 is formed with a worm gear 25 which is in meshing engagement with a plunger driving gear 26 for driving an oil pump plunger (not shown).

A water pump casing 28 is secured by means of a plurality of bolts 27 to the oil pump housing 23 and rotatably supports a water pump drive shaft 29. The shaft 29 is axially aligned with the oil pump shaft 20 and has one end connected with the shaft 20 through a connection 30 and the other end supporting a pump vane disc 33. The water pump casing 28 is formed with a water inlet port 34 which is connected with a water supply conduit 35 for drawing water from engine cooling water jacket (not shown) in the engine cylinder. The casing 34 is further formed with an outlet port 37 connected with a water passage 39 which is formed in the crankcase 2 and in turn connected through a passage 41 with the water jacket in the cylinder 44.

The water pump drive shaft 29 carries a seal device 32 so as to prevent water from leaking along the shaft. The water pump casing 28 is provided with a flange 40 around the outlet port 37 and secured to the crankcase 2 by means of bolts (not shown) extending through the flange 40 and threaded into the crankcase 2. An O-ring seal 38 is provided around the outlet port 37 in the water pump casing 28.

According to the arrangement of the illustrated embodiment of the present invention, the accessory driving shaft is constituted by the oil pump driving shaft 20 and the water pump driving shaft 29 which are axially aligned and connected together. The accessory driving shaft is supported at one end by the crankcase 2 through the oil pump housing 23 and at the other end also by the crankcase 2 through the water pump casing 28 which is rigidly supported by the crankcase 2 at the flange 40. Thus, the accessories can be rigidly mounted on the engine crankcase 2 and driven by an accessory driving shaft which is arranged in parallel with the crankshaft 1.

The invention has thus been shown and described with reference to a specific embodiment, however, it should be noted that the invention is in no way limited to the details of the illustrated structures but changes and modifications may be made within the scope of the appended claims.

We claim:

1. An internal combustion engine including a crankcase, a crankshaft mounted in the crankcase for rotation about a first axis, an oil pump including a first casing mounted on the crankcase externally thereof, a first accessory drive shaft mounted in the first casing for rotation about a second axis extending parallel with the first axis, one end of the first accessory drive shaft being interconnected with and driven by the crankshaft, means for driving the oil pump from the first accessory drive shaft, first bearing means in the first casing supporting said one end of the first drive shaft, a second casing mounted on the crankcase externally thereof, a second accessory shaft rotatably mounted in the second casing, said second shaft axially aligned with and drivingly connected with the other end of the first accessory drive shaft, a water pump element mounted for rotation with the second accessory shaft, second bearing means in the second casing providing the sole bearing support for said other end of the first drive shaft, said second casing being releasably supported on said first casing, water passage means in the crankcase, and water port means in the second casing directly connected with said water passage means in the crankcase.

* * * * *